(12) United States Patent
Lam et al.

(10) Patent No.: US 7,421,832 B2
(45) Date of Patent: Sep. 9, 2008

(54) SUPPLYING A STRIP OF MATERIAL

(75) Inventors: Steve Sze Wan Lam, Richmond (CA); Alan Jeffrey Campbell, Germantown, TN (US); Randall Flaman, Winter Park, FL (US)

(73) Assignee: BKI Holding Corporation, Memphis, TN (US)

( * ) Notice: Subject to any disclaimer, the term of this patent is extended or adjusted under 35 U.S.C. 154(b) by 0 days.

(21) Appl. No.: 11/058,423

(22) Filed: Feb. 16, 2005

(65) Prior Publication Data

US 2005/0183392 A1 Aug. 25, 2005

Related U.S. Application Data

(62) Division of application No. 10/175,349, filed on Jun. 20, 2002, now Pat. No. 6,918,232.

(60) Provisional application No. 60/299,157, filed on Jun. 20, 2001.

(51) Int. Cl.
*B65B 63/04* (2006.01)
(52) U.S. Cl. .............. 53/429; 53/434; 53/435
(58) Field of Classification Search ............. 53/415, 53/429, 434, 435, 116, 117, 520, 157; 493/413, 493/414; 270/30.01–30.08, 39.01–39.05
See application file for complete search history.

(56) References Cited

U.S. PATENT DOCUMENTS 3,729,367 A 4/1973 Shore et al.

(Continued)

FOREIGN PATENT DOCUMENTS

DE AT 003 762 U1 10/1998

(Continued)

*Primary Examiner*—Brian D Nash
(74) *Attorney, Agent, or Firm*—Adrian D. Battison; Michael R. Williams; Ryan W. Dupuis

(57) ABSTRACT

A package of a strip of material is formed by slitting or perforating a web to separate the web into side by side strips and fan folding the web to form a plurality of side by side stacks of the strips. The strip of each stack is spliced to the strip of the next stack to form a continuous strip through the package which can be unfolded for supply continuously to an end use machine. The package while compressed is wrapped by a packaging material which includes a bottom header plate and heat shrink bag wrapped around the package and under a bottom header plate and heat sealed to a bottom surface of the bottom header plate. The spliced connecting portions are held attached to the end plane of the package by a series of spaced tie members formed of spare strip material each of which extends across the end plane and has opposed ends of the tie member tucked between two of the strip portions of respective ones of the outermost stacks. Downstream of the supply and prior to folding a splice detector is responsive to the presence of a supply splice in the web and the control of the process is arranged to mark for rejection any package wherein the number of detected supply splices contained therein is greater than a predetermined number. The strip portions are spliced by ultrasonically heating the strip portions while in contact preferably at a butt splice while using heat sealable bridging fibers to effect a heat seal between the portions.

37 Claims, 8 Drawing Sheets

U.S. PATENT DOCUMENTS

| | | | |
|---|---|---|---|
| 3,739,544 A | | 6/1973 | Hanemann |
| 3,852,144 A | * | 12/1974 | Parry .................. 156/510 |
| 3,945,853 A | * | 3/1976 | Anderson et al. ........... 53/329 |
| 4,196,562 A | * | 4/1980 | Hirschman ............... 53/450 |
| 4,222,356 A | * | 9/1980 | Ueda et al. ............ 123/568.18 |
| 4,237,837 A | * | 12/1980 | Toda et al. ............ 123/568.18 |
| 4,342,147 A | * | 8/1982 | Thompson .................. 29/417 |
| 4,507,109 A | | 3/1985 | Meschi |
| 4,517,790 A | * | 5/1985 | Kreager ................... 53/552 |
| 4,532,166 A | * | 7/1985 | Thomsen et al. ............ 428/57 |
| 4,547,184 A | | 10/1985 | Bunch, Jr. |
| 4,603,817 A | | 8/1986 | O'Connor |
| 4,904,319 A | * | 2/1990 | Divincenzo et al. ........ 156/73.4 |
| 4,938,817 A | * | 7/1990 | Langley ................. 156/73.1 |
| 5,056,703 A | * | 10/1991 | Sawada et al. ............ 228/158 |
| 5,066,527 A | * | 11/1991 | Newell ................. 428/35.6 |
| 5,227,228 A | * | 7/1993 | Newell ................. 428/102 |
| 5,229,181 A | * | 7/1993 | Daiber et al. .............. 428/58 |
| 5,232,529 A | * | 8/1993 | Miyake ................. 156/73.4 |
| 5,286,586 A | * | 2/1994 | Foley et al. ................ 430/56 |
| 5,356,682 A | | 10/1994 | Stewart et al. |
| 5,638,569 A | * | 6/1997 | Newell ................. 15/229.6 |
| 5,698,358 A | * | 12/1997 | Yu ..................... 430/127 |
| 5,921,064 A | | 7/1999 | O'Connor |
| 5,927,051 A | | 7/1999 | O'Connor et al. |
| 5,966,905 A | | 10/1999 | O'Connor et al. |
| 6,321,512 B1 | | 11/2001 | O'Connor et al. |

FOREIGN PATENT DOCUMENTS

| | | |
|---|---|---|
| DE | 199 18 765.7 | 3/2001 |
| EP | 0 842 756 | 10/1987 |
| EP | 0 778 015 | 6/1997 |
| FR | 1582024 | 9/1969 |
| FR | 2703024 | 9/1994 |
| WO | WO 98/58864 | 12/1998 |
| WO | WO 00/53513 | 9/2000 |
| WO | WO 01/02143 | 1/2001 |

* cited by examiner

SUPPLYING A STRIP OF MATERIAL

This application claims priority under 35 U.S.C. 119 from Provisional Application Ser. No. 60/299,157 filed Jun. 20, 2001.

This application is a divisional application from application Ser. No. 10/175,349 filed Jun. 20, 2002 now issued as U.S. Pat. No. 6,918,232.

This invention relates to a method of supplying a strip material.

BACKGROUND OF THE INVENTION

Strips of material are used in many end uses including but not limited to the manufacture of diapers and other absorbent products. The strips are cut on the manufacturing line at longitudinally spaced transverse cut lines to divide the strip into individual sheet elements each used in the manufacture of a respective absorbent product. Generally these strips are also cut to provide different widths along the length of the strip for various reasons including for shaping of the products to better match the body of the user and for better aesthetics. Most current processes of this type die cut the elements from a single strip of the material having a width at least equal to the maximum required width and discard the waste at the sides formed by cutting away the side portions to the narrower scalloped width. Attempts are made to recycle the waste portions, generally by grinding and returning the materials to the strip manufacturer. However, recent developments have increased the complexity of the materials thus increasing the cost and making recycling more difficult. There is therefore pressure to reduce the amount of waste.

Previously packages of a continuous strip of material have been formed using a technique known as "festooning" in which the strip is folded back and forth to lay a series of strip portions back and forth with each portion being folded relative to the next about a line transverse to the strip. The technique of festooning has been available for many years and is used in packaging many different types of materials but particularly material of a fibrous nature such as fabric, nonwoven strips and the like. In this technique, the strip is conventionally guided into a receptacle such as a cardboard box while a first reciprocating movement causes portions of the strip to be laid across the receptacle and folded back and forth and a second reciprocating movement causes the positions of the portions to be traversed relative to the receptacle transversely to the portions. Normally the receptacle comprises a rigid rectangular container at least partly of cardboard having a base and four upstanding sides.

In U.S. Pat. No. 5,966,905 issued Oct. 19, 1999 and in PCT International Application No. PCT/CA98/00592 published on 30 Dec. 1998 under publication No. WO 98/58864, O'Connor et al disclose an arrangement for packaging a strip in which the package is formed from a plurality of side by side stacks each containing one fan folded length of the strip where the bottom end of each stack is connected by a splice portion to the top end of the next adjacent stack so that the strip is continuous through the package.

In PCT International Application No. PCT/CA00/00196 published on 14 Sep. 2000 under publication No. WO 00/53513 is disclosed an arrangement for folding and wrapping in a packaging material a package structure of the type described in the above patent.

This arrangement has achieved significant commercial success and provides a structure which can supply at high speed a continuous length of strip to an end use machine such as a converting line for manufacturing diapers or feminine hygiene products. However other end uses of the strip can also be provided.

In PCT International application WO 01/02143 published Jan. 11, 2001 is disclosed by Eberle a package of the same construction as proposed by O'Connor in which the strips instead of being completely slit so that each is wholly separated from the next, the strips are separated in a manner which leaves small bridging sections periodically along the length of the slit line so as to hold the strip elements side by side during the folding and stacking process.

In German application 19918765.7 is provided further disclosure of the package structure of Eberle (assigned to Gevas) including particularly the arrangement of the spliced connecting portions at the end of the package.

Also in German Application by Eberle (also assigned to Gevas) is also disclosed some detail of the folding arrangement by which the web with the partially slit strip elements is folded into the fan folded stack.

SUMMARY OF THE INVENTION

It is one object of the present invention, therefore, to provide an improved method of supplying a strip of material.

According to a general statement of the invention, there is provided a method of supplying strip material comprising:

providing two strip portions;

the strip portions containing a proportion of thermally bondable material;

and connecting an end of one strip portion to an end of the other strip portion to form a continuous length of the strip material;

the strip portions being connected by ultrasonically heating the strip portions while in contact to effect a heat seal between the portions formed by the thermally bondable material.

In some cases the strip portions are slightly overlapping.

In other cases the strip portions are butting end to end.

Preferably the thermally bondable material comprises a proportion of the fibers which are synthetic heat sealable fibers.

Preferably the heating is effected in spaced patches to leave unsealed portions between the patches at spaced positions across the width of the strip portions.

Although the strip may be provided in many different forms of package structure, preferably the method includes forming a plurality of side by side stacks of the strip material in which the strip material of one stack is separated from the strip material of the next adjacent stack sufficiently for the strip material of the stacks to be unfolded and withdrawn in turn separately from the strip material of the other stacks;

in each stack repeatedly folding the strip back and forth so that the stack contains a plurality of folded overlying strip portions of the strip, with each strip portion being folded relative to one next adjacent strip portion about a first fold line transverse to the strip and relative to a second next adjacent strip portion about a second fold line transverse to the strip and spaced from the first fold line;

arranging the strip portions of each stack to form a plurality of first fold lines at one end of the stack and a plurality of second fold lines at an opposed end of the stack;

arranging the strip portions of each stack with the first and second surfaces thereof generally parallel to a top surface and a bottom surface of the stack, with the strip of each stack continuous through the stack between a bottom strip portion and a top strip portion;

arranging the plurality of stacks side by side with the side edges of the strip portions of each stack adjacent the side edges of a next adjacent stack;

connecting the bottom strip portion of each stack to the top strip portion of another of the stacks by a connecting portion to form a continuous length of the strip material formed by connected stacks;

and wrapping the side by side stacks and the spliced connecting portions therebetween in a packaging material to maintain the strip material in the stacks contained and protected during transportation.

In accordance with one aspect of the invention the packaging material includes a top generally planar header member, a bottom generally planar header member and a surrounding flexible bag covering at least part of the top header member and the bottom header member.

Preferably top header member comprises a sheet material defining a planar panel portion, such as of cardboard although other semi-rigid or rigid materials can also be used, and side walls which are turned down at right angles to lie along respective sides and ends of the package.

Preferably the bottom header comprises a relatively rigid board formed for example inexpensively from a sandwich construction including top and bottom sheets interconnected by a stiffener member such as corrugated paper material.

Preferably the bag comprises a tubular member which may be pre-formed as a bag with a sealed end or may be supplied as a tubular material which is sealed on line at an upper end to cover the top header.

Preferably the bag is heat sealed to an underside of the bottom header and more preferably the bag is heat sealed to the bottom header only around an outer edge leaving a center portion exposed. For this purpose the bottom plate includes a material which can be readily heat sealed to the bag such as a layer of plastics material or a bag surrounding the bottom plate, although other techniques for attachment of the bag to the plate may be used such as adhesive.

Preferably a label providing identifying indicia related to the package is located on the package between the top header and the bag.

Preferably the bag is provided with a periphery larger than the periphery of the package and is heat shrunk by a surrounding oven into engagement with the periphery of the package.

Preferably the package is placed under compression to reduce the height thereof prior to shrinking of the bag. However the package may also be wrapped under little or no compression.

Preferably two packages are stacked for transportation vertically one on top of another and arranged by selecting the stacking height relative to the desired amount of compression to have a combined height matching an allowable height of a transportation container, thus maximising transportation efficiency. Alternatively the packages can be wrapped and transported individually and stacked horizontally on their sides.

Preferably the vertically stacked packages are stretch wrapped together to remain in relative position during lifting and storage.

Where the splice connections include a twist this is preferably located on the top of the stacks underneath the top header plate, but may be located on the side which is the end plane of the package.

Preferably the packages includes a leading end of the continuous strip and a trailing end and wherein the leading end and the trailing end are marked in a manner which distinguishes one from the other.

According to a second aspect of the invention, the connecting strip portions are held attached to the end plane by at least one tie member which extends across the end plane and has opposed ends of the tie member tucked between two of the strip portions of respective ones of the outermost stacks.

Preferably there are a plurality of tie members at vertically spaced locations of the common end plane.

Preferably the tie member is formed from a spare portion of the strip material, although other materials can be used.

The tie member can be used as a base to be marked with indicia identifying the package.

According to a third aspect of the invention, downstream of the supply and prior to folding there is provided a splice detector responsive to the presence of a supply splice in the web to provide an output indicative of same; and wherein when the number of detected supply splices contained therein is greater than a predetermined number the package is identified as such.

Preferably the folding and the location of the supply splices are arranged so as to maintain the number of supply splices less than the predetermined number.

BRIEF DESCRIPTION OF THE DRAWINGS

Embodiments of the invention will now be described in conjunction with the accompanying drawings in which:

FIG. 4 is a top plan view of the apparatus of FIG. 5.

In the drawings like characters of reference indicate corresponding parts in the different figures.

DETAILED DESCRIPTION

Figure 7:
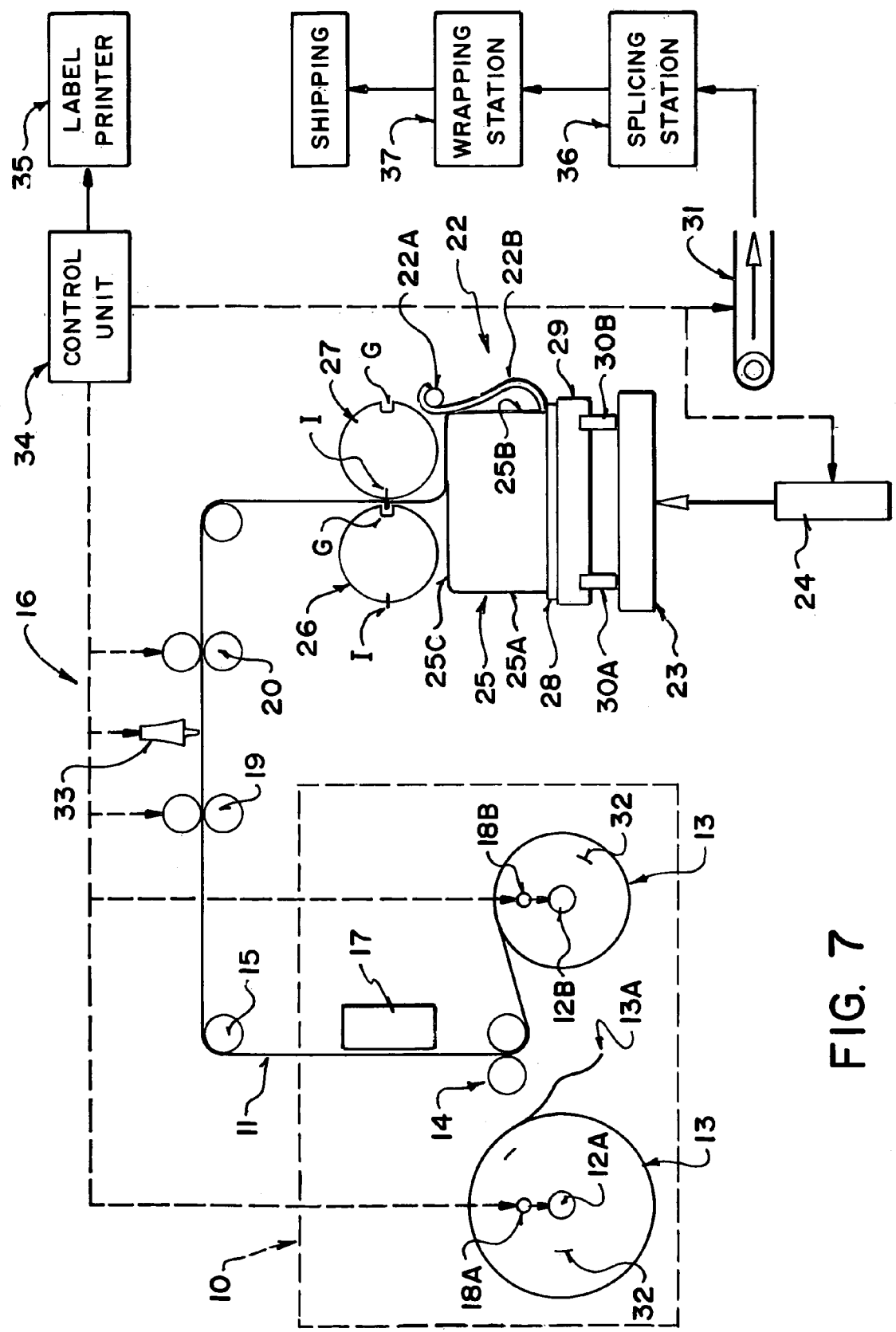
FIG. 7 is a schematic illustration of the method of forming the stacks of side by side strip material from a supply web.

Turning firstly to FIG. 7, there is shown schematically a stack folding machine of the type generally described in the above patent applications. The machine comprises a web supply section 10 from which a web 11 is supplied in a width substantially equal to the width of the completed package. The web supply section includes two mounting spindles 12A and 12B each for receiving a respective supply roll 13 of the web. The web is fed from one of the supply rolls 13 through a supply system 14 and over a guide roller 15 to a control and slitting section 16. At any one time, a selected one of the supply rolls 13 is in use supplying the web and when that supply roll is exhausted, the next supply roll is brought into supply and a leading end 13A is spliced to a trailing end of the exhausted roll at a splicing assembly 17. The amount of material remains on the spindle 12A or 12B is measured by a sensing system 18A, 18B so as to determine when the supply is about to become exhausted thus allowing the operator to halt operation of the supply system and the machine for splicing the leading end to the trailing end at the splicing station 17. In an alternative arrangement (not shown) an accumulator can be provided at the splicing station 17 which allows the supply to continue to run while the splicing is effected.

In the control and slitting section 16, is provided a web guide system schematically indicated at 19 which controls the forwarding speed and adjusts the transverse position of the web side to side so as to locate the web relative to slitting rollers 20.

The slitting rollers are of the type shown in the above patent application of Gevas which act to perforate the web at a plurality of transversely spaced longitudinal slit lines so as to provide slits along the slit lines each of which is separated from the next by a short bridge section. In practice the slits may be of the order of 0.5 inches long and the bridge sections of the order 0.005 inches in length. However these dimensions may be significantly varied and are selected so as to provide for the particular material concerned from which the web is formed the characteristics that the strip portions so formed in the web are held together side by side for further processing so that the side by side strips remain connected as a web but can be readily separated by tearing along the slit lines.

Although it is preferred in this arrangement that the slit lines are defined with the remaining bridge sections but also the construction as set forth hereinafter can be effected with strips which are wholly slit so that the web is separated into individual strips which are packaged using the techniques described hereinafter.

Downstream of the slitting section 16, the web enters a packaging section 22 which is shown schematically and is of the type shown in the above patent of Gevas. Thus the folding machine includes a table 23 which is movable vertically on a jack 24 so that it can be raised and lowered as the folded stack 25 of the web increases in height. The web is folded back and forth by a pair of folding rollers 26 and 27 which alternately grip and release the web so as to pull it to the ends 25A and 25B of the stack. The stack is supported upon a base board 28 itself carried on a horizontal support plate 29 which oscillates on support members 30A and 30B relative to the table 23.

Each of the rollers 26 and 27 includes a gripper G and an insertion bar I at diametrically opposed positions so that as the rollers rotate the insertion bar I of one roller inserts the web into the gripper G of the other roller at the point of closest approach of the rollers and then the rollers turn with the web gripped to carry the web toward the respective end of the stack 25.

Thus the stack is built up by the back and forth folding action of the rollers to a required height as determined by the operating conditions. At the required height the support plate 29 is moved downwardly to a position along side a conveyor 31 arranged to receive the stacked web and the support board 28 which are displaced from the support plate 29 and moved onto the conveyor for moving to the remaining sections of the operation as described hereinafter.

The folding section 22 further includes a tail forming roller 22A which acts to roll a portion of the web from the previously formed stack so that a tail portion 22B of the web is exposed from the bottom of the stack and is carried up one end of the stack to the roller 22A. When the stack folding is complete, therefore, a portion of the web extends along the end 25B of the stack and as the stack is moved from the table 23 and to the conveyor 31, that portion of the web which is rolled onto the roller 22A is pulled up the end 25B of the stack and laid onto the top 25C of the stack.

The supply rolls 13 include supply splices schematically indicated at 32 where an original master roll from which the supply rolls are slit is spliced when exhausted to the leading end of a further master roll. Such supply splices are of course well known and are commonly present in rolls of this type. In addition to the supply splices there are of course additional splices provided when the exhausted roll 13 is connected at its trailing end to the leading end of the next roll 13.

In one technique, the splices are provided by splicing tape which is applied to both surfaces of the butting edges of the webs. The machine further includes a splice detector 33 which is located downstream of the supply section and upstream of the slitter 20. Splice detectors of this type are known and operate to sense the density of the web so that the increased density at the splice is detected so as to provide an indication to the control unit 34 of the location of the splice.

The control unit 34 operates to control each of the driven elements of the machine so as to provide the necessary interrelation between those elements to control the speed of operation to properly effect the folding of the required structure of the stack from the web concerned. The controlled unit is responsive to the splice detector and to the detectors 18A and 18B so as to control the supply of the web to the folding machine. The control unit is responsive to the number of splices detected by the splice detector 33 and operates to control the height of the stack formed so as to halt the formation of the stack in the event that an additional splice beyond the predetermined maximum number of splices is going to be included into the stack structure. Thus the number of supply splices in the stack can be determined by the control unit and can be recorded on a label printed by label printer 35. In addition the control unit applies on the label information relating to the characteristic of the material concerned and identifies the origin of the material and provides an identification number for the stack so formed.

The completed stack of the web including the slit lines formed by the slitter is thus supplied on the conveyor 31 and due to the bridge sections between the individual strips the stack remains as an integral structure which can be transported on the conveyor without the danger of the slit strips being divided and individually collapse. The height of the stack is selected so that it remains stable without danger of toppling so that the stack can be transported openly on a conveyor without the necessity for side walls. On the conveyor the completed stack is moved initially to a splicing station 36 and from the splicing station to a wrapping station 37.

Figure 1:
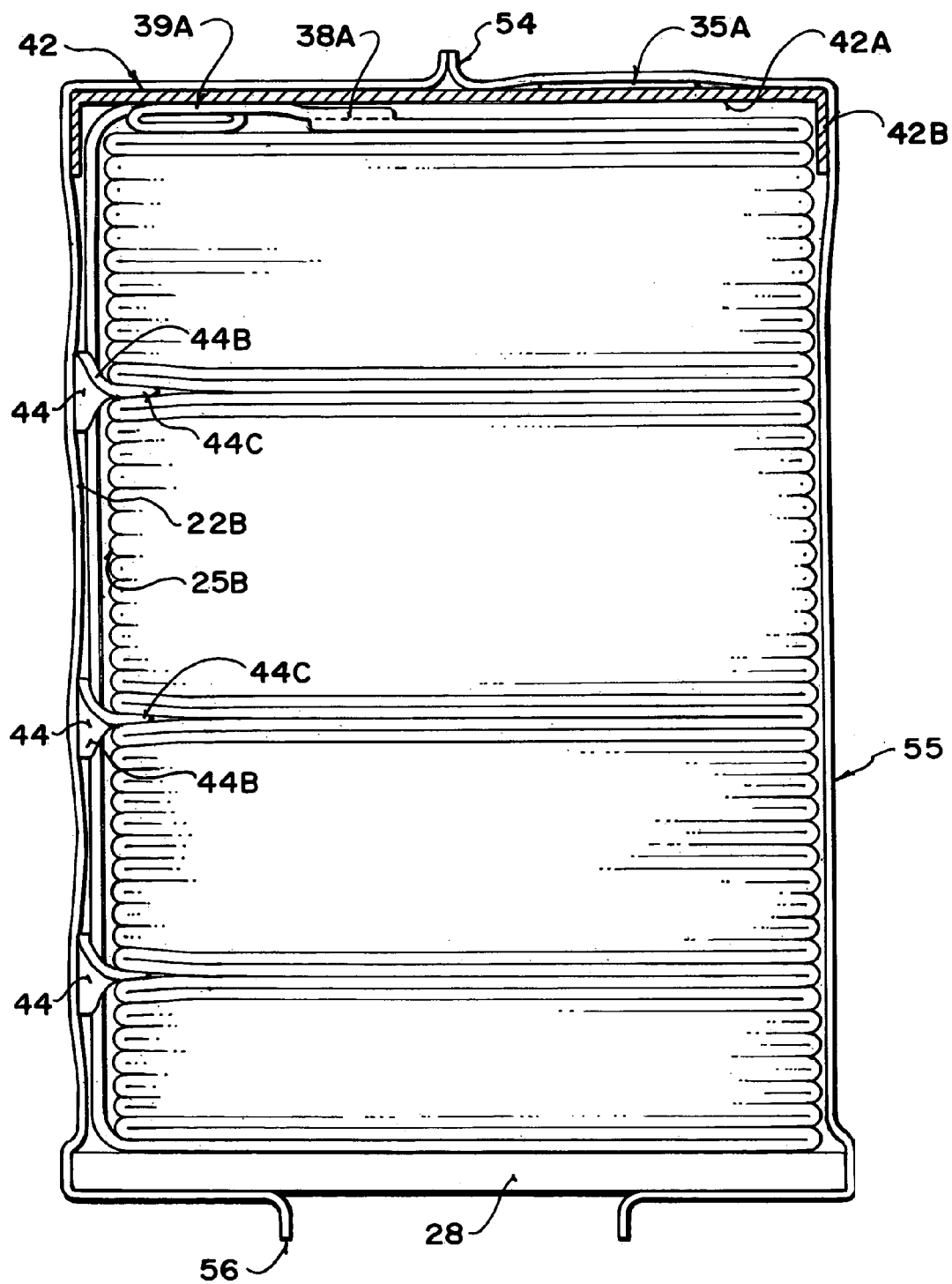
FIG. 1 is a side elevational view of a package of a continuous strip according to the present invention including a packaging material wrapping and containing the package.
Figure 2:
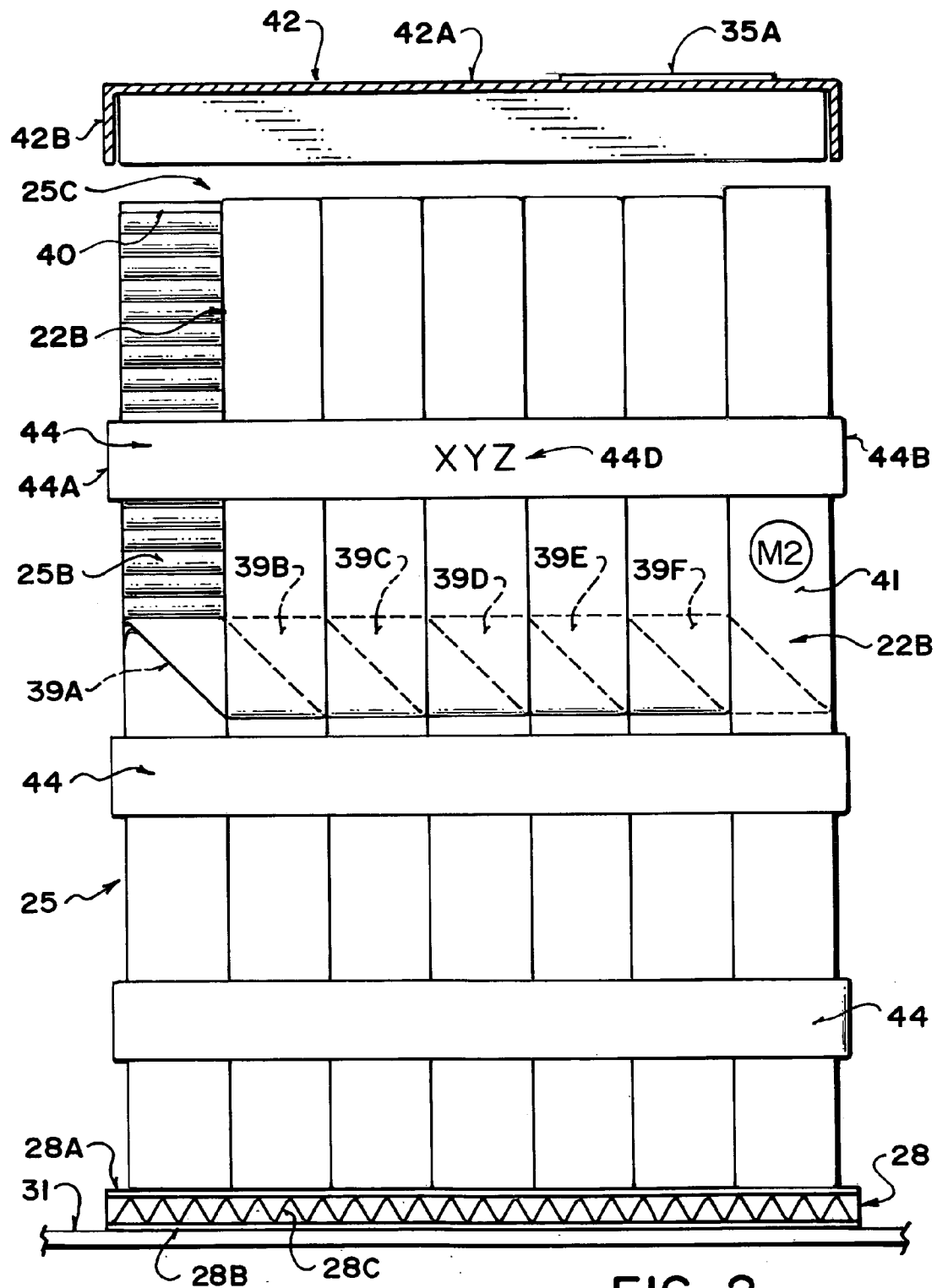
FIG. 2 is an end elevational view of the package of FIG. 1, with the flexible packaging material excluded for convenience of illustration.
Figure 3:
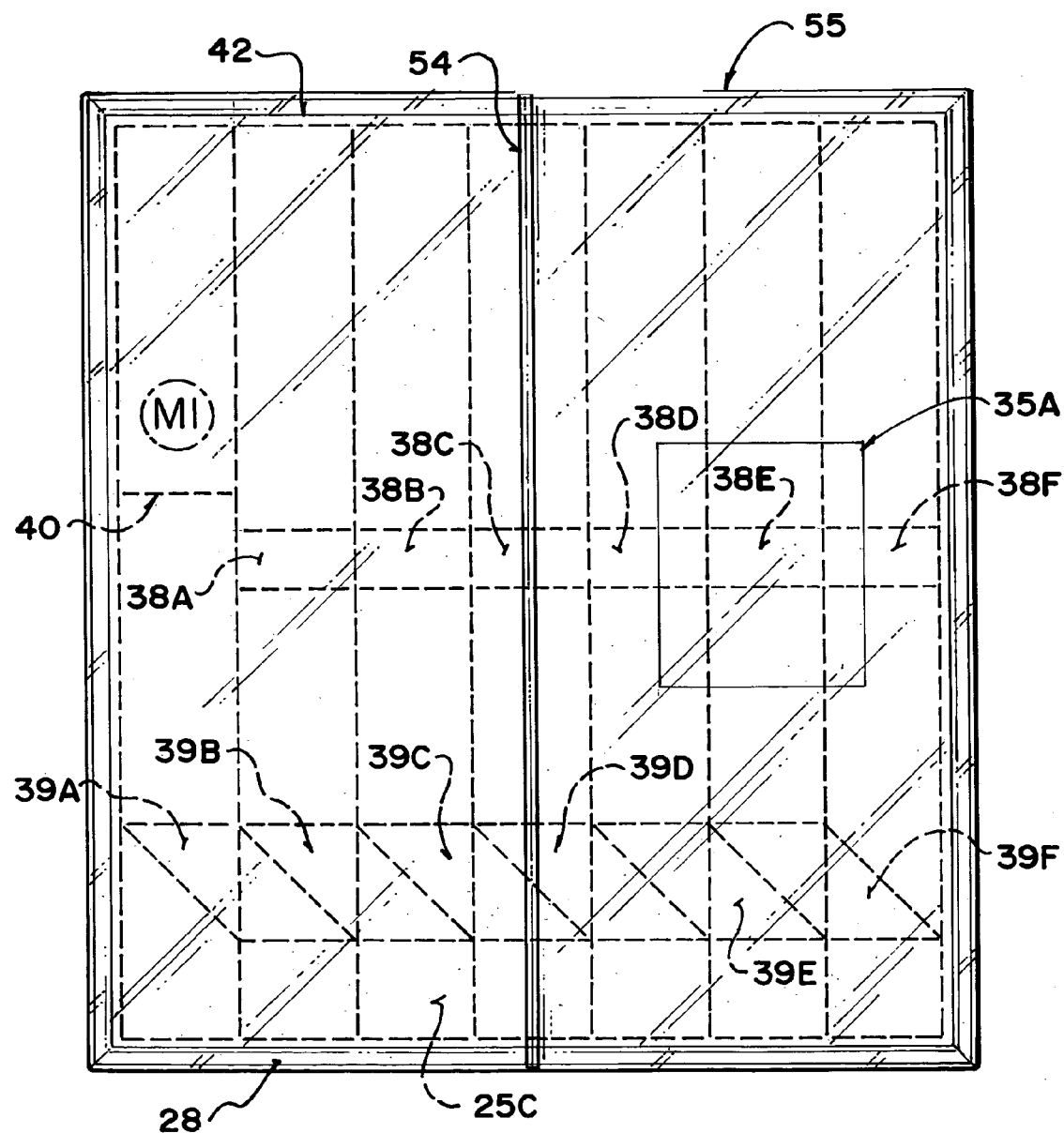
FIG. 3 is a top plan view of the package of FIG. 1, with the flexible packaging material included and the top header ready to place onto the top of the package.

Turning now to FIG. 2, the splicing station is shown where the stack 25 is located on a portion of the conveyor 31. The completed spliced stack is also shown in FIGS. 1 and 3.

The support board 28 is shown in more detail in FIG. 2 and comprises a substantially rigid board defined by an upper sheet 28A, a bottom sheet 28B and an intervening corrugated stiffener layer 28C. Thus the board is sufficiently rigid to resist bowing caused by compression forces as described hereinafter.

At the splicing station 36 as shown in FIG. 2, the end portion 22B of the web is divided into individual strips and those strips are laid along the end 25B of the stack and onto the top 25C. At that location the end of the strip from the first stack is moved to a position aligned with the second stack and is attached to the top end of that stack at a splice 38A. Before splicing the strip is twisted at 39A. The splice connections are then continued through each of the remaining stacks at splices 38B, 38C, 38D, 38E and 38F (shown in FIG. 3).

Similarly twists are applied at 39B, 39C, 39D, 39E and 39F. Thus each stack is connected to the next adjacent stack leaving a leading end 40 at the first stack and trailing end 41 at the last stack. The leading end 40 is marked with suitable identification markings indicated schematically indicated at M1 and the trailing end is marked with distinguished markings M2 so that the end user can clearly identify the leading end and the trailing end for connection to the trailing end and leading end respectively of the next adjacent packages.

After the splicing and twisting is completed, the top 25C of the package is covered by a top header plate 42 formed of a suitable sheet material such as cardboard to form a panel 42A and four depending sides 42B for covering the sides and ends of the package. If located at the top, the splices and the twists are therefore protected underneath the top header and are not exposed in the length of the strip extending from the bottom of the package along the end face to the top of the package. However the splices and/or twists may be moved from the top to the side as shown in FIG. 2 and indeed this is the preferred location of the twists. The side location is preferred because at the twist the location of the strip on the package is transferred laterally from a position aligned with the first stack to a position aligned with the second stack. Thus as shown in FIG. 2, as the tail piece connecting the two stacks passes over the top corned of the second stack it rests on the second stack. In this way during use of the package at a use location, the tail is supported as the first stack is unfolded and remains supported until the whole of the first stack is unfolded and transfer of unfolding occurs onto the second stack.

A label from the label printer 35 is printed and applied as indicated at 35A onto the top of the header plate 42. The label identifies the characteristics of the package and includes a package number.

Figure 5:
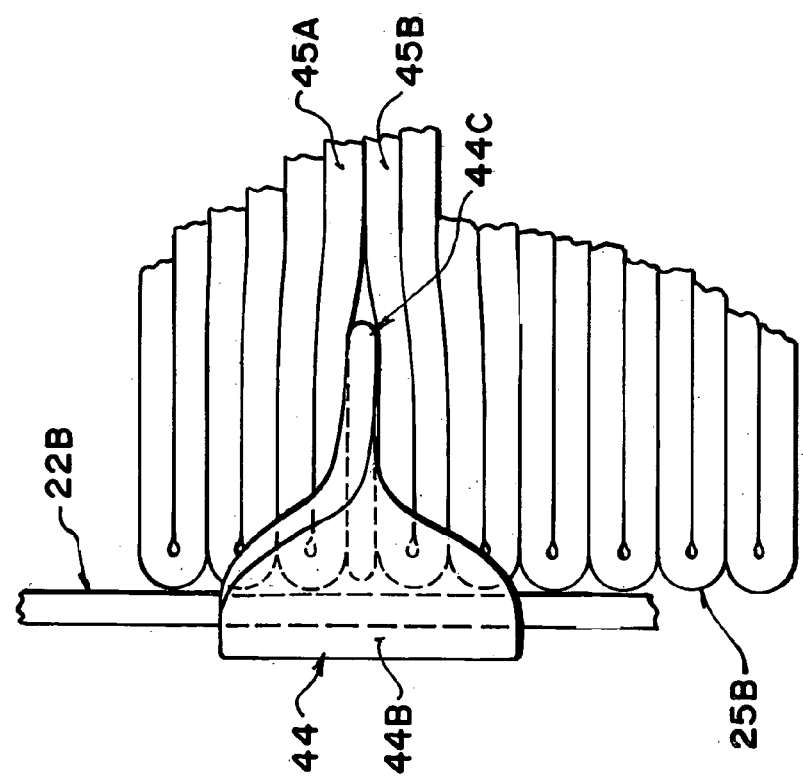
FIG. 5 is a side elevational view on an enlarged scale of a portion of the package of FIG. 1 showing the location of the tie member into the side of the package.

The splice connecting portions 22B extending along the end 25B of the package are held in place against that end plane by a plurality of tie members 44. Each of the tie members comprises a strip portion of the strip material which is applied across the end face with two ends 44A and 44B exposed beyond the sides of the package. These two ends are tucked in between two of the strip portions indicated at 45A and 45B in FIG. 5 so that the ends are simply pressed into place and held in place by friction between the strip portions. Thus the strip forming the tie member is simply twisted so that its flat portion as indicated at 44C is inserted flat between the strip portions 45A and 45B. This technique simply locates the tie in place and holds it flat against the end face 25B thus trapping the portions 22B against the end face. Depending upon the height of the package, the number of tie members can be selected to ensure that the end connecting portions of the strip are held in place and are prevented from freely flapping and becoming distorted. The number of tie members will vary depending upon the height of the package and the amount of compression. The use of the strip material which is readily available in the manufacturing process avoids the use of other materials which could become contaminated within the package.

In addition to the markings on the label, additional indicia as indicated at 44D are applied onto one or more of the tie members as an additional identification number for the package.

Figure 4:
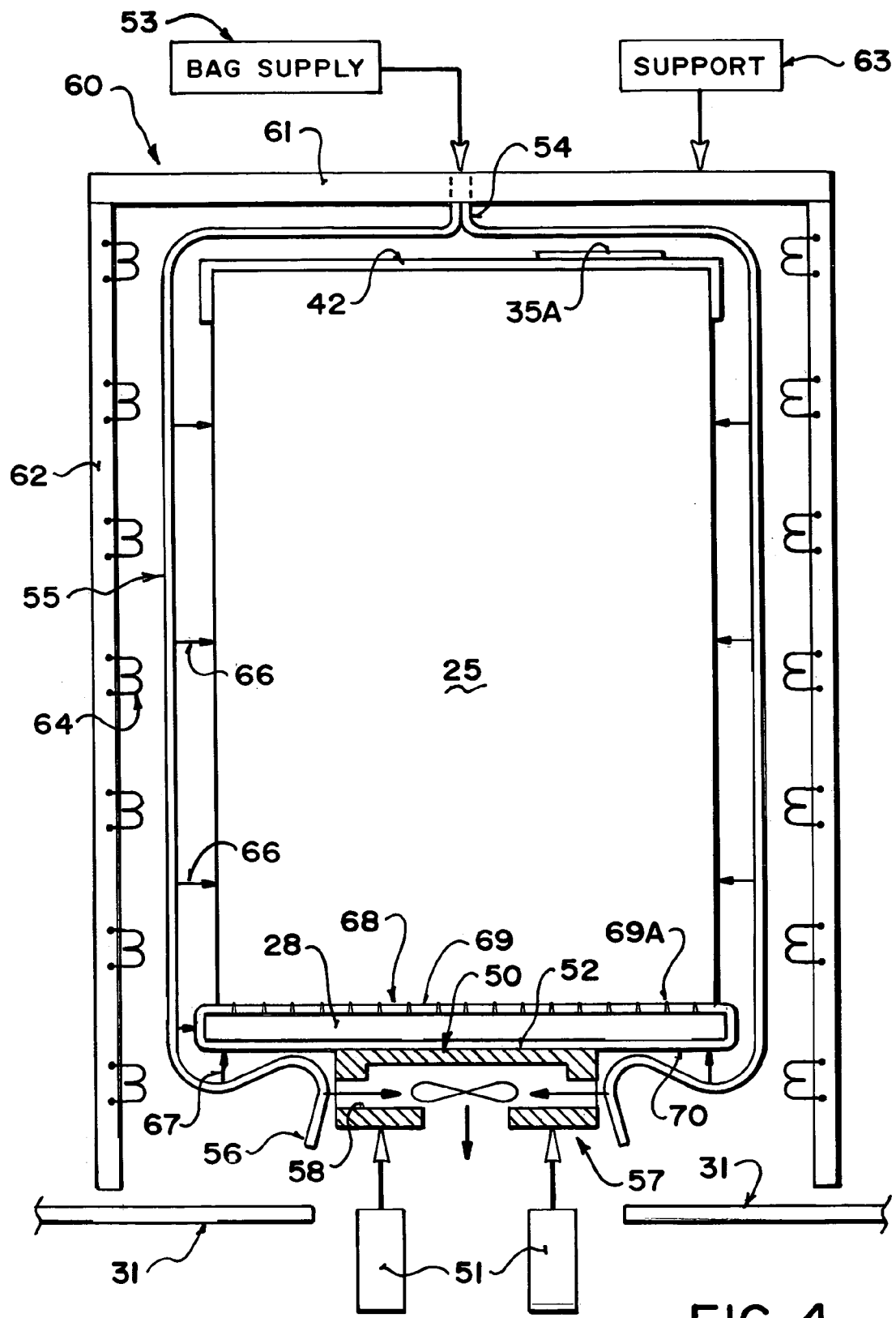
FIG. 4 is a side elevational view of a compression and wrapping apparatus for forming the package of FIG. 1.

The splice package is moved on the conveyor 31 from the splicing station to the wrapping station. At the wrapping station, the package as shown in FIG. 4 including its bottom plate 28 and top header 42 together with the splices and connecting portions which are not shown in FIG. 4 for convenience of illustration is mounted onto a support platform 50 which can be raised vertically from the level of the conveyor into a raised position on suitable jacks 51. The platform includes a platform surface 52 of sufficient dimension to support the package structure on the base plate 28 while leaving outer portions beyond a central area of the base plate exposed outside of the platform. The platform may be rotatable in order to orient the package about a central vertical axis into a required orientation for wrapping.

A bag supply system schematically indicated at 53 is arranged above the platform 50 and includes a supply of tubular bag material together with grasping elements which grasp the tubular bag material and pull it downwardly for engaging over the sides of the package. The tubular material has a periphery as indicated in FIG. 4 which is significantly greater than that of the package so that the bag material can pass readily over the package without abrading the sides. The bag supply includes a heat sealing device for sealing a seam 54 in the top of the bag 55 either before or after is applied onto the package. The length of the bag is such that bottom edges 56 of the tubular bag of material extend beyond the bottom plate 28 into the area of the platform 50. Within the platform 50 is provided a suction system generally indicated and schematically shown at 57 which includes a plurality of section openings 58 around the peripheral surface of the platform thus facing the lower parts 56 of the bag 55. The section underneath the board 28 thus acts to pull the bag inwardly around the board 28 and toward the platform.

An oven assembly 60 is provided at the wrapping station and is supported above the platform 50. The oven assembly 60 and the bag supply 53 are arranged so that they can be moved into place and operated independently without interference with one another so that the bag supply is moved out of position, then the oven assembly 60 is moved into position around and on top of the package and the bag.

The oven member 60 includes a top compression plate 61 and depending walls 62. The top compression plate 60 simply forms a rigid structure so that it can be moved downwardly relative to the platform 50 on a support schematically indicated at 63 so that the package is compressed between the platform 50 and the top wall 61 thus gently squeezing the package downwardly to decrease its height by compressing the strip material and expelling air from the interstices within the strip material so as to reduce the height of the stack and to reduce the thickness of each of the strip portions of the strip material. The amount of compression can vary widely depending upon the requirements of the end user and the characteristics of the material from which the stack is formed. As the stack is compressed, the air is expelled through the sides and ends of the stack and that air is released through the bottom of the bag either into the environment or into the section system 57. The section system 57 may assist with the extraction of air but primarily the compression is effected mechanically between the platform and the top plate 61. The plate 28 overhangs the sides of the platform but has sufficient stiffness to accommodate the compression forces without creasing or fracturing.

When compressed, heating elements 64 in the depending side wall 62 are activated so as to apply heat within the area of the oven to the material of the bag 55. The bag material is selected so that it is of a heat shrinkable nature and conventional materials of this type are well known and readily available to the person skilled in the art. The heat shrinking action provided by the oven is sufficient to draw the bag material inwardly to the sides as indicated at 66 and also pulls the bottom of the bag upwardly onto the bottom surface of the board 28 as indicated at 67. The board 28 is wrapped by a heat sealable plastics material 68 including an upper surface 69 underneath the stack at a bottom surface 70 underneath the board. In a preferred arrangement, this plastic sheet material is formed as a sleeve which is inserted onto the board so that it covers the board on both sides. In the alternative, however, the plastics material may be laminated onto at least the bottom surface of the board so that the bottom surface is covered by the attached plastics sheet material 70 for heat sealed connection to the material of the bag. The plastic bag 68 placed around the bottom plate for sealing has perforated dimples 69A at least on its top layer 69 to provide an increased friction between the material of the strips and the plastic sheet to improve folding when the strips are folded initially onto the board 28. This has been surprisingly found to improve bale quality by reducing the tendency of the strips to slip relative to the board during folding on the folding machine. The plastics material is selected so that a heat sealing action occurs between the bottom layer and the material of the bag under the action of the heat from the oven 60. Thus the heating action of the oven causes the bag to be pulled inwardly so that it wraps tightly around the stack and also heat seals to the bottom of the bottom plate 28 in the area around the outside of the platform.

When the heating action is complete and the shrinking and heat sealing is completed, the oven is withdrawn by its support 63 leaving the package and the platform to cool for a period of time sufficient to ensure setting of the bag material. This also acts to cool air within the package so that the bag is more tightly drawn down onto the outside of the package. The label 35A which was placed on top of the top plate 42 is thus now sealed underneath the top surface of the bag and is thus visible through the bag material which is clear. Also the numbers on the tie 44 are visible through the side walls of the bag material.

Figure 6:
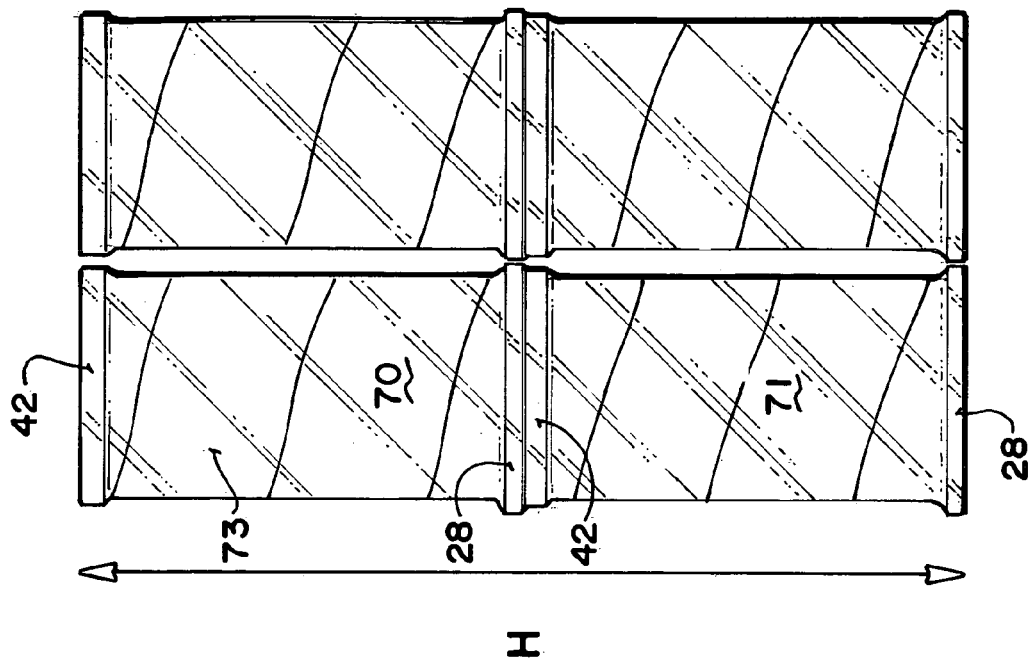
FIG. 6 is a side elevational view of a plurality of the packages of FIG. 1 shown wrapped and stacked for shipping.

When the package is cooled, the platform 50 is lowered and the package relocated on the conveyor 31 for transportation to a shipping location. At the shipping location as shown in FIG. 6, two or more of the wrapped stacks as indicated at 70 and 71 are stacked one on top of the other so that the base plate 28 of the upper package is located on top of the header plate 42 of the lower of the packages. These packages are then wrapped helically with a stretch wrap material 73 using a conventional wrapping machine which rotates around the stacked packages. The stretch wrap material thus acts to protect the bag, to apply additional compressing forces onto the outside surface of the package and also to link the two stacked packages so that they are held together as an integral liftable structure.

It will be noted that the dimensions of the base plate 28 are slightly greater than the dimensions of the footprint of the package so that side edges of the base plate overhang the sides and ends of the package. This provides protection for the corners of the package at the base and prevents the bag from pulling inwardly and collapsing or creasing the strip portions at the base of the package. Similarly the header plate with its depending side walls 42B prevents the bag from pulling inwardly on the top strip portion and causing creasing thereof either in the strip portions themselves or at the folds and splices on the top surface of the package.

The height H of the two stacked packages is arranged by selecting the height of the stack when initially folded relative to the amount of compression desired so that the height H is equal to the required shipping height. In particular the dimensions of a container for shipping the product are initially determined, depending upon the shipping method, and based upon that total height, a calculation is carried relating to the height of the initially folded stack so that when compressed and wrapped the two or more stacks when located one on top of the next provide a total height H equal to the required shipping height. The wrapped and stacked packages are then inserted side by side into the required container as shown in FIG. 6.

Turning now to FIGS. 8 through 11 is shown arrangements for forming an ultra sonic heat sealed splice to replace the tape splice previously described.

Figure 8:
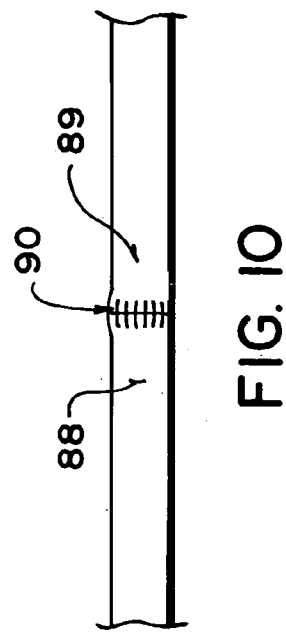
FIG. 8 is a top plan view of a splice between two strip portions formed using ultrasonic energy.
Figure 9:
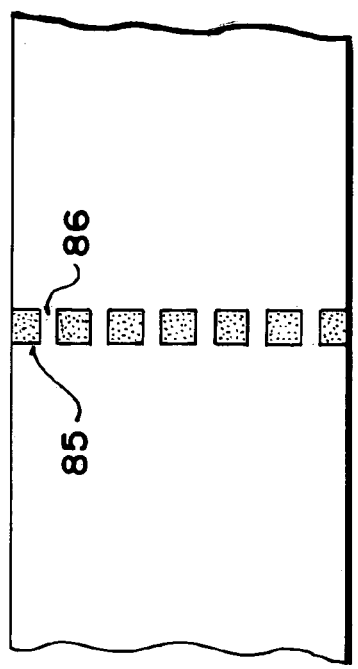
FIG. 9 is a side elevational view of the splice of FIG. 8.

In FIGS. 8 and 9 is shown a first splicing arrangement in which the web or strip is slightly overlapped at two ends 80 and 81 and ultrasonic energy is provided from a conventional heating system 82 through a heating head 83 onto a plate 84.

The amount of synthetic fiber present in air laid paper is conventionally of the order of 12 to 15%, although this amount can vary in a wider range, and it has been found that this is sufficient so that the fibers within the material can bond to provide a heat sealed connection between the two ends 80 and 81. Similarly, it has been found that absent the presence of synthetic fibers in the air-laid paper, a heat sealed connection between the ends can still be effected if there is sufficient quantity of other thermally bondable material present within the paper. For example air-laid paper often contains other binders such as latex or synthetic powders which can serve as bonding agents for this heat sealed connection. The head 83 is arranged to provide heating action over spaced patches 85 leaving portions 86 between those patches which are unheated and therefore free from bonding action. These spaces can allow fluid movement into and longitudinally along the material from one strip portion to the next during end use of the strip in a finished absorbent product.

Figure 10:
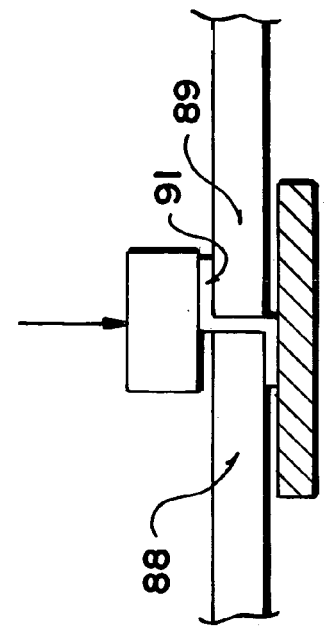
FIG. 10 is a side elevational view of a butt splice formed using ultrasonic energy.

In FIG. 10 is shown an alternative splice which is effected as a butt splice between two ends portions 88 and 89 where there are sufficient fibrous connections as indicated schematically at 90 between the butted end effected by heat sealing of the fibers caused by the application of heat from the ultra sonic energy to cause the portions 88 and 89 to be spliced together.

Figure 11:
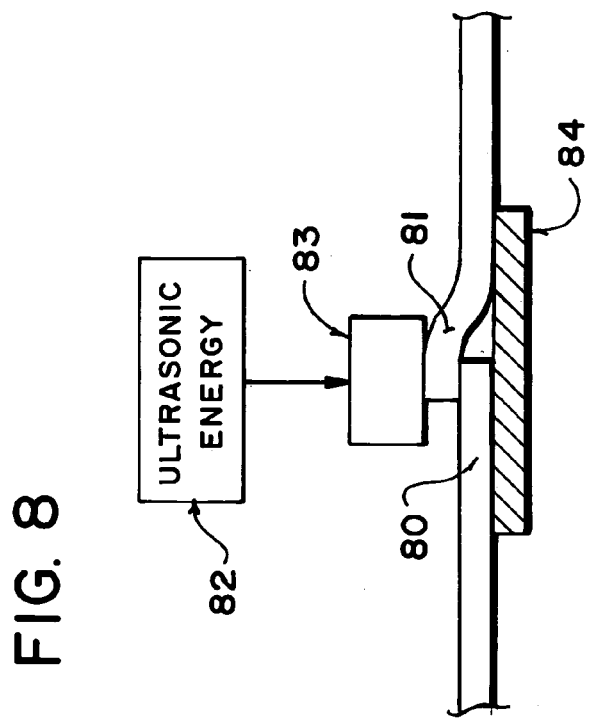
FIG. 11 is a side elevational view of a further alternative form of splice formed using ultrasonic energy.

In a further alternative arrangement as shown in FIG. 11, a butt splice is provided but is supported by the addition of further fibrous materials 91 which are applied through the butt splice and onto each of the end portions 88 and 89 so that there are fibers available to bond to the heat sealable fibers within the strip materiel. In FIG. 11 this is shown as a non-woven web inserted between the butt ends and laid parallel to both the strips. However, different techniques can be used for different types of material depending upon the fiber content and various other characteristics. Thus the splice can be formed, in a method not shown, by adding loose fibers (i.e. bico, PET, etc.) to the butt splice joint area, by a dispenser or other technique, then activating the fibers with ultrasonic energy to bond the joint.

Currently the standard splice technique used in air laid manufacturing is the taped splice. The tape is applied to one, or more commonly both, sides of the two ends of air laid substrate being joined. The tapes are routinely not acceptable in the customers' finished products, and so they are rejected during converting. This amounts to a waste loss for the customer, and therefore there is interest and incentive in finding a splice material and/or method which would allow the inclusion of the splice in the finished products.

The alternative splicing technique described above provides a technique which can avoid the discarding of product containing the splice. The ultrasonic equipment can, however, be configured to allow wider splicing widths. This would allow the splicing which occurs in the web upstream of the folding to also be done ultrasonically, and therefore those splices would also not have to be rejected in the finished products.

As air laid webs are produced on the air laid machine, they are first wound into jumbo rolls. These jumbo rolls are then rewound and slit to narrower widths on rewinder/slitters. Splices are sometimes made during this process for various reasons. From this point, the slit rolls, now called master rolls, are sent to the folding process. As the master rolls are unwound and folded, they are spliced one to the other to allow continuous folding. Each column of the bale or stack would include the splices made during these upstream operations. Finally, each column of a bale is spliced to the adjacent column. So it can be seen that there is the potential for a very high number of splices within a bale. Indeed, the specifications for bales include a maximum number of splices which can be present within a single bale; this is to limit rejects due to splices to a maximum specified by each customer. Currently, most customers perceive these numerous splices as a disadvantage. If all of the splices described could be of a type which could be included in the finished product, this could instead amount to an advantage for a lower waste, higher productivity packaging concept.

Currently, the column-to-column splices on a bale are made by taping the web ends together. This has numerous negatives such as cost of the tape, weakening of the tape over time, tedious and slow manual splicing operation, and customer rejection of the spliced section. A potential technology being investigated for replacing splicing tapes is ultrasonic welding. This technology could feasibly eliminate all of the negatives noted for taped splices. In this technology, very high frequency vibrations are applied to substrates in a concentrated area, causing the substrate to heat up and melt in this localized area. The substrate is required to contain a minimum level of synthetic material in order for the melting to occur. In the splicing of air laid materials, the bicomponent fiber or other thermally bondable material content allows the ends of the web to be welded together.

Commercial heating devices are available from Sonobond Ultrasonics and a suitable ultrasonic welder is the Model Sureweld 20. Numerous weld patterns can be used and have been tested; all were of a discontinuous configuration so as to allow fluid transport across the seam. Weld conditions can be varied slightly according to the pattern being used, but all welds were made in 0.8 seconds, which is a length of time acceptable for allowing a user to generate the full length of splice or full number of splices which is necessary in the above process while remaining within an acceptable total time period. It is feasible to position the web ends so as to consistently control overlap to a minimum. Some minimum overlap of the web ends may be required to reliably splice the materials, unless additional synthetic overlays are employed to provide bonding sites as shown in FIG. 10.

Dry tensile strength, wicking rate, and total absorbent capacity tests performed on each sample show that both absorbent capacity and wicking are unaffected by the splice. This is important from the aspect of being able to include the splice in a customer's finished product. The tensile strength is potentially affected. As bico content increases the impact of a welded splice is greater. While in some cases, dependent on the end-use requirements of the material, the tensile strength may be decreased to the extent the customer would still require rejection of the splice, there is sufficient tensile retention to withstand the unfolding and converting process.

Ultrasonic splicing of air laid webs is thus a viable alternative to traditional taped splices, or to such alternatives as sewn splices.

The savings in consumables (tapes) is also an advantage of this technology.

The fact that an ultrasonic splice can be processed through the folder allows this method to be utilized for master roll splicing (both at the folder & the rewinder), thus further reducing consumables and customer rejects.

Figure 12:
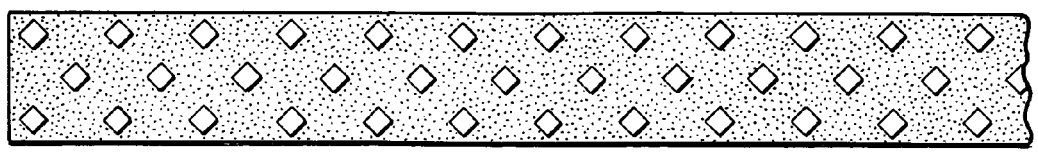
FIG. 12 is a series of alternative patterns for the splice head for forming the splice of FIG. 8.
Figure 12:
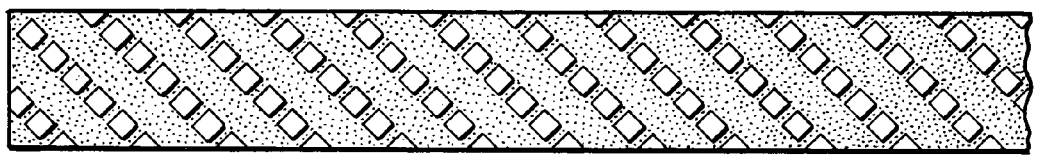
Figure 12:
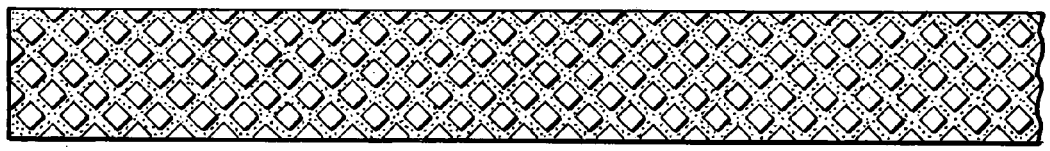
Figure 12:
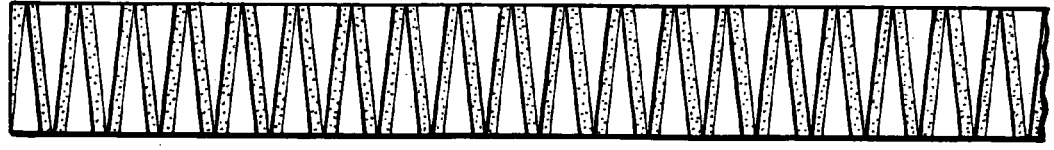

In FIG. 12 is shown a series of acceptable patterns for the splice head which allow the formation of a splice which provides sufficient tensile strength without interfering with fluid flow at or through the splice. In the drawings, the white area is the raised part of the tool and the grey is the recessed part so that on the seal on the splice the white would end up as the welded part and the grey would be the un-welded portion.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A method of supplying strip material comprising:
   providing first and second strip portions of fibrous nonwoven material;
   the strip portions containing a proportion of thermally bondable material;
   and connecting an end of the first strip portion to an end of the second strip portion to form a continuous length of the strip material;
   forming a connected portion between the ends of the first and second strip portions by ultrasonically heating the ends of the strip portions while in contact to effect a heat seal between the ends of the strip portions formed by the thermally bondable material;
   continuously feeding the first strip portion from a packaged supply of the strip material to an end use machine in which the strip material is used to manufacture a composite product including the strip material;
   and, when the first strip portion is exhausted and the end thereof is reached, the connected portion between the ends causing to the second strip portion to be fed to the end use machine.

2. The method according to claim 1 wherein the strip portions are slightly overlapping.

3. The method according to claim 1 wherein the strip portions are buffing end to end.

4. The method according to claim 1 wherein the thermally bondable material comprises fibers which are synthetic heat sealable fibers.

5. The method according to claim 1 wherein the heating is effected in spaced patches to leave unsealed portions between the patches at spaced positions across the width of the strip portions.

6. The method according to claim 1 wherein additional heat sealable bridging fibers are added to the strip portions at the ends thereof prior to connection of the strip portions by the ultrasonic heating.

7. The method according to claim 6 wherein strip portions are butting end to end.

8. The method according to claim 1 further including:
   forming a plurality of side by side stacks of the strip material in which the strip material of one stack is separated from the strip material of the next adjacent stack sufficiently for the strip material of the stacks to be unfolded and cancelled in turn separately from the strip material of the other stacks;

in each stack repeatedly folding the strip back and forth so that the stack contains a plurality of folded overlying strip portions of the strip, with each strip portion being folded relative to one next adjacent strip portion about a first fold line transverse to the strip and relative to a second next adjacent strip portion about a second fold line transverse to the strip and spaced from the first fold line;

arranging the strip portions of each stack to form a plurality of first fold lines at one end of the stack and a plurality of second fold lines at an opposed end of the stack;

arranging the strip portions of each stack with the first and second surfaces thereof generally parallel to a top surface and a bottom surface of the stack, with the strip of each stack continuous through the stack between a bottom strip portion and a top strip portion;

arranging the plurality of stacks side by side with the side edges of the strip portions of each stack adjacent the side edges of a next adjacent stack;

connecting the bottom strip portion of each stack to the top strip portion of another of the stacks by a connecting portion to form a continuous length of the strip material formed by connected stacks;

and wrapping the side by side stacks and the spliced connecting portions therebetween in a packaging material to maintain the strip material in the stacks contained and protected during transportation.

9. The method according to claim 8 wherein the step of wrapping with a packaging material includes;
providing a flexible bag in the form of a tubular member with a closed upper end;
providing a top generally planar header member separate from the bag,
providing a bottom generally planar, substantially rigid member separate from the bag;
placing the generally planar header member on the top of the stacks;
placing the generally planar bottom member on the bottom of the stacks;
leaving sides of the stacks exposed between the header member and the bottom member;
and surrounding the stacks and the header member and at least part of the bottom member with the flexible bag;
with the bag acting to cover and engage the top header member, the exposed sides of the stacks and at least part of the bottom header member.

10. The method according to claim 9 wherein the top header member comprises a sheet material defining a planar panel portion and side walls which are turned down at right angles to lie along respective sides and ends of the package.

11. The method according to claim 9 wherein the bottom member comprises a sandwich construction including top and bottom sheets interconnected by a stiffener member.

12. The method according to claim 9 wherein bag comprises a tubular member sealed at an upper end to cover the top header member.

13. The method according to claim 9 wherein the bag is heat sealed to an underside of the bottom member.

14. The method according to claim 9 wherein the bag is heat sealed to the bottom header only around an outer edge leaving a center portion exposed.

15. The method according to claim 9 wherein a label providing identifying indicia related to the package is located on the package between the top header and the bag.

16. The method according to claim 9 wherein the bag is provided with a periphery larger than the periphery of the stacks and is heat shrunk by a surrounding oven into engagement with the periphery of the stacks.

17. The method according to claim 9 wherein the stacks are placed under compression to reduce the height thereof prior to shrinking of the bag.

18. The method according to claim 9 wherein two wrapped packages are stacked for transportation vertically one on top of another and arranged to have a combined height matching an allowable height of a transportation container.

19. The method according to claim 9 wherein the packages are stretch wrapped together.

20. The method according to claim 9 the splice connections each include a twist which is located at the side of the stacks.

21. The method according to claim 9 wherein the stacks include a leading end of the continuous strip and a trailing end and wherein the leading end and the trailing end are marked in a manner which distinguishes one from the other.

22. The method according to claim 8 wherein the step of wrapping with a packaging material includes;
providing a flexible bag in the form of a tubular member with a closed upper end;
providing a bottom generally planar, substantially rigid member separate from the bag;
placing the generally planar bottom member on the bottom of the stacks;
and surrounding the stacks and at least part of the bottom member with the flexible bag wrapped around the stacks and under the bottom member;
and heat sealing a bottom edge of the bag to a bottom surface of the bottom member.

23. The method according to claim 8 wherein the step of wrapping with a packaging material includes;
providing a flexible bag in the form of a tubular member closed at its upper end;
providing a top generally planar header member separate from the bag,
providing a bottom generally planar member separate from the bag;
placing the generally planar header member on the top of the stacks;
placing the generally planar bottom member on the bottom of the stacks;
leaving sides of the stacks exposed between the header member and the bottom member;
surrounding the stacks and the header member with the flexible bag so as to cover the top header member;
placing the stacks under compression to reduce the height thereof;
providing the bag with a periphery larger than the periphery of the stacks and heat shrinking the bag by a surrounding oven into engagement with the exposed sides of the stacks;
and heat sealing a bottom edge of the bag to the bottom member to close the bag.

24. The method according to claim 8 wherein the step of wrapping with a packaging material includes;
providing a flexible bag in the form of a tubular member with a closed upper end;
providing a bottom generally planar member separate from the bag;
leaving sides of the stacks exposed above the bottom member;
the bottom member comprising a substantially rigid stiffening member formed from cardboard wrapped by a layer of a plastics material covering a top surface and a bottom surface of the stiffening member;

placing the generally planar bottom member on the bottom of the stacks;

surrounding the exposed sides of the stacks and at least part of the bottom member with the flexible bag wrapped into engagement with the exposed sides of the stacks and under the bottom member;

and heat sealing a bottom edge of the bag to the plastics material on the bottom surface of the bottom member.

25. The method according to claim 8 wherein the connecting portions are held attached to the end plane by at least one tie member which extends across the end plane and has opposed ends of the tie member tucked between two of the strip portions of respective ones of the outermost stacks.

26. The method according to claim 25 wherein there are a plurality of tie members at vertically spaced locations of the common end plane.

27. The method according to claim 25 wherein the tie member is formed from a spare portion of the strip material.

28. The method according to claim 25 wherein the tie member is marked with indicia identifying the package.

29. The method according to claim 8 including providing a web of material from a supply roll which may include one or more supply splices;

when the supply roll is depleted, splicing to a trailing end of the supply roll a leading end of a second supply roll to form a supply splice, where the second supply roll also may include one or more supply splices;

forming in the web a plurality of side by side separating lines dividing the web into a plurality of strips of the material in which the material of one strip is separated from the material of the next adjacent strip sufficiently for the strip to be unfolded and cancelled in turn separately from the other strips;

downstream of the supply and prior to folding providing a splice detector responsive to the presence of a supply splice in the web to provide an output indicative of same;

and identifying for rejection any package wherein the number of detected supply splices contained therein is greater than a predetermined number.

30. The method according to claim 29 wherein the predetermined number is two.

31. The method according to claim 29 including arranging the folding and the location of the supply splices so as to maintain the number of supply splices less than the predetermined number.

32. The method according to claim 1 wherein the thermally bondable material comprises a latex or synthetic powder.

33. The method according to claim 1 wherein the fibrous non-woven material is air laid.

34. A method of supplying strip material comprising:
providing two strip portions of fibrous non-woven material;

the strip portions containing fibers which are not thermally bondable and a proportion of thermally bondable material;

and connecting an end of one strip portion to an end of the other strip portion to form a continuous length of the strip material;

the strip portions being connected by ultrasonically heating the strip portions while in contact to effect a heat seal between the portions formed by the thermally bondable material.

wherein the thermally bondable material comprises a latex or synthetic powder.

35. The method according to claim 34 wherein the fibrous non-woven material is air laid.

36. The method according to claim 34 wherein the strip portions are slightly overlapping.

37. The method according to claim 34 wherein the strip portions are butting end to end.

* * * * *